US006662330B1

(12) United States Patent
Hershey

(10) Patent No.: US 6,662,330 B1
(45) Date of Patent: Dec. 9, 2003

(54) JOINT RANGE REJECT AUTOMATIC REPEAT REQUEST PROTOCOL

(75) Inventor: Stephen Hershey, Palatine, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/545,641

(22) Filed: Apr. 7, 2000

(51) Int. Cl.$^7$ .............................. G08C 25/02; H04L 1/18
(52) U.S. Cl. ........................ 714/748; 370/349; 370/394; 370/474
(58) Field of Search .................................. 714/748, 790, 714/758, 951; 370/465, 342, 313, 311, 474, 515, 535, 280, 328, 522, 348–350; 340/7.43, 7.22, 7.46; 455/412, 456, 509, 524, 321, 575, 352; 375/265; 709/204, 243; 725/81, 80, 119; 710/263, 266, 268; 380/270, 29

(56) References Cited

U.S. PATENT DOCUMENTS 5,799,012 A * 8/1998 Ayerst et al. ................ 370/336
5,862,452 A * 1/1999 Cudak et al. .................. 725/81

OTHER PUBLICATIONS

Lettieri et al. "Adaptive frame length control for improving wireless link throughput, range, and energy efficiency," Joint Conference of the IEEE Computer and Communications Societies; IEEE, vol. 2: pp. 564–571; Apr. 2, 1998.*

Liu et al. "Adaptive source rate control for real–time wireless video transmission;" Mobile Networks and Applications, pp. 49–60, 1998.*

Ozugur et al. "Comparison of go–back–N and selective reject ARQ modes of HDLC over half–duplex and full–duplex IR links and the effects of window size and processor speed in utilization," IEEE, vol. 2: pp. 708–712; Sep. 1998.*

* cited by examiner

Primary Examiner—Christine T. Tu
Assistant Examiner—Guy Lamarre

(57) ABSTRACT

ARQ protocol useful for transferring delay-sensitive data blocks between sending and receiving devices (102, 104) over an error-prone communication link (116). The ARQ protocol allows either the sender or receiver to initiate termination of the transfer from sender to receiver of one or more blocks. Blocks eligible for negative acknowledgement by a receiving device are determined by a reception determination procedure performed by the sending device. Negative acknowledgement of eligible blocks is based on a number of consecutive blocks reported as corrupt, which number may include an allowable number of non-corrupt blocks. The allowable number of non-corrupt blocks is based on a Minimum Corruption Density (MCD) parameter that may be adjusted by a receiving device depending on available bandwidth for retransmission of blocks or other criteria.

29 Claims, 7 Drawing Sheets

JOINT RANGE REJECT AUTOMATIC REPEAT REQUEST PROTOCOL

FIELD OF THE INVENTION

This invention relates generally to communication systems, and more particularly to an Automatic Repeat Request (ARQ) protocol useful for transferring delay-sensitive data between sending and receiving devices over error-prone communication links.

BACKGROUND OF THE INVENTION

Historically, communication systems have employed separate protocols for the transfer of delay-insensitive data and delay-sensitive data from a sender to receiver. Delay-insensitive data transfer services have used Automatic Repeat Request (ARQ) protocols that allow for reliable transfer of the data stream regardless of delay. ARQ protocols permit the receiver of a stream of data blocks to request the retransmission of data blocks that were either not received or received corrupted from the sender. ARQ protocols are often accompanied with forward error correction (FEC) to reduce the number of required retransmissions.

Examples of known ARQ protocols include Stop-and-Wait, Go-Back-N, and Selective Repeat. In Stop-and-Wait ARQ, a receiver sends an acknowledge (ACK) message to a transmitter after a given block is received successfully. The transmitter waits until the ACK message is received for a given block before it proceeds with transmitting the next block in a sequence of blocks. If the receiver detects an error in a given block, it sends a negative acknowledgement (NACK) message to the transmitter, and the transmitter then retransmits the given block. In Go-Back-N and Select Repeat ARQ, the transmitter is sending message data and the receiver is sending acknowledgment data simultaneously. After transmitting a given block, the transmitter continues to transmit additional blocks in the sequence even though an ACK has not yet been received for that given block. In Go-Back-N ARQ, if the receiver sends a NACK message indicating that the given block needs to be retransmitted, the transmitter will retransmit the given block and all subsequent blocks that were transmitted prior to receiving the NACK message. In Selective Repeat ARQ, the transmitter retransmits the given block, but then resumes the transmission sequence where it left off prior to receiving the NACK message. A block subsequent to the erroneous block is not retransmitted unless it is specifically identified as erroneous by a NACK message.

The Stop-and-Wait, Go-Back-N, and Selective Repeat ARQ protocols were developed to transfer delay-insensitive blocks from transmitter to receiver. For example, these protocols are well-suited to transferring a data file over an error-prone link, where the file must be transferred perfectly but the time required to perform the file transfer is of secondary importance. However, the known ARQ procedures are not well suited for transferring delay-sensitive data over error-prone communication links. For example, in packetized voice and video applications, transfer time is of primary importance. After a certain elapsed time the packet is of no value to the receiver. In these delay-sensitive applications, the transmitter and receiver should stop attempting to transfer blocks from a packet which is no longer of value to the receiver. Historically, delay-sensitive services did not use an ARQ protocol, but rather used forward error correction (FEC) techniques to accomplish error correction. Recent improvements in bandwidth management algorithms and physical layer data transfer technologies now permit limited retransmission of blocks within delay-sensitive data streams. However, the known art does not feature an ARQ protocol capable of handling the demands of both delay-sensitive and delay-insensitive data streams over a high transfer rate, high transfer delay data link. Furthermore, there does not exist an ARQ protocol sufficiently flexible to dynamically adapt to changes in data stream delay sensitivity.

An ARQ protocol capable of transferring delay-sensitive blocks must include a mechanism by which a transmitter (or receiver) can inform its peer entity that attempts to retransmit a particular block are no longer useful and will be (or should be) terminated. The known art employs two methods by which a transmitter can inform a receiver that it no longer wishes to transfer a particular block or blocks (i.e., prematurely terminate block transfer). In the first method, a field is added to the block transfer request message indicating that a particular block or blocks will not be transferred. For example, the block transfer request message might indicate that the block with sequence number 22 is being transferred and that further transmission attempts for the block with sequence number 19 will be halted. In the second method, a separate message is sent from transmitter or receiver indicating which block or blocks will not be transferred. The European Telecommunications Standards Institute (ETSI) HIPERLAN/2 ARQ protocol employs this method.

These two block transfer termination methods share a serious drawback. If the message specifying which block or blocks will not be transferred is lost, then the transmitter must detect by some mechanism that this has occurred and retransmit the request. These additional termination request messages increase the bandwidth consumption and block transfer delay of the ARQ protocol. Also, the ARQ protocol becomes much more complex.

A popular technique for increasing the efficiency of Selective Repeat ARQ protocols is to utilize a single message to negatively acknowledge multiple blocks. The known art employs a bit field, where each bit in the field provides the reception status of a single block. For example, if a bit within the bit field is 1, the corresponding block has been received successfully (ACK). If a bit within the bit field is 0, the corresponding block has not been received successfully (NACK). However, a problem with the bit field approach is that as data transfer rates and data transfer delays increase, the number of bits within the bit field must become quite large in order to provide useful negative acknowledgement information to the sender. This is because the receiver may have a large number of consecutive blocks to negatively acknowledge, but a limited number of bits with which to do it. This is a particular problem on high data rate wireless links during fading conditions. A large bit field requires a large negative acknowledgement message, which can prevent piggy-backing. In piggybacking, a data transfer request message for a stream flowing in one direction is packaged with a data transfer response message (ACK and/or NACK) for a stream flowing in the other direction. A data link supporting ARQ message piggybacking is usually much more efficient than a corresponding data link without piggybacking.

Moreover, existing ARQ protocols do not have a means by which an external entity (such as a bandwidth manager) can dynamically alter key aspects of ARQ protocol performance in response to changes in link operating conditions. Instead, ARQ protocol performance is rigidly fixed by the particular procedures incorporated into the protocol. However, such flexibility would be useful to engineers designing advanced scheduling algorithms for managing the transfer of multiple, simultaneous, independent delay-sensitive data streams over error-prone links. For example, the ability to dynamically change the bandwidth consumption and aggregate block transfer delay performance of an ARQ protocol would allow a link bandwidth manager to tailor the performance of the ARQ protocol to the current link load. If the link is lightly loaded, ARQ bandwidth consumption could be increased with a corresponding decrease in aggregate block transfer delay. If the link becomes congested, the bandwidth manager could scale back the ARQ bandwidth consumption with a corresponding increase in aggregate block transfer delay.

The foregoing discussion indicates that there is a need for an ARQ protocol that is capable of handling the demands of both delay-sensitive and delay-insensitive data transfers over a high transfer rate, high transfer delay data link subject to burst errors. Furthermore, there is a need for an ARQ protocol with data transfer reliability, delay, and bandwidth consumption performance that can be adapted dynamically by the transmitter or receiver to compensate for changes in link operating conditions. The present invention is directed to satisfying or at least partially satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
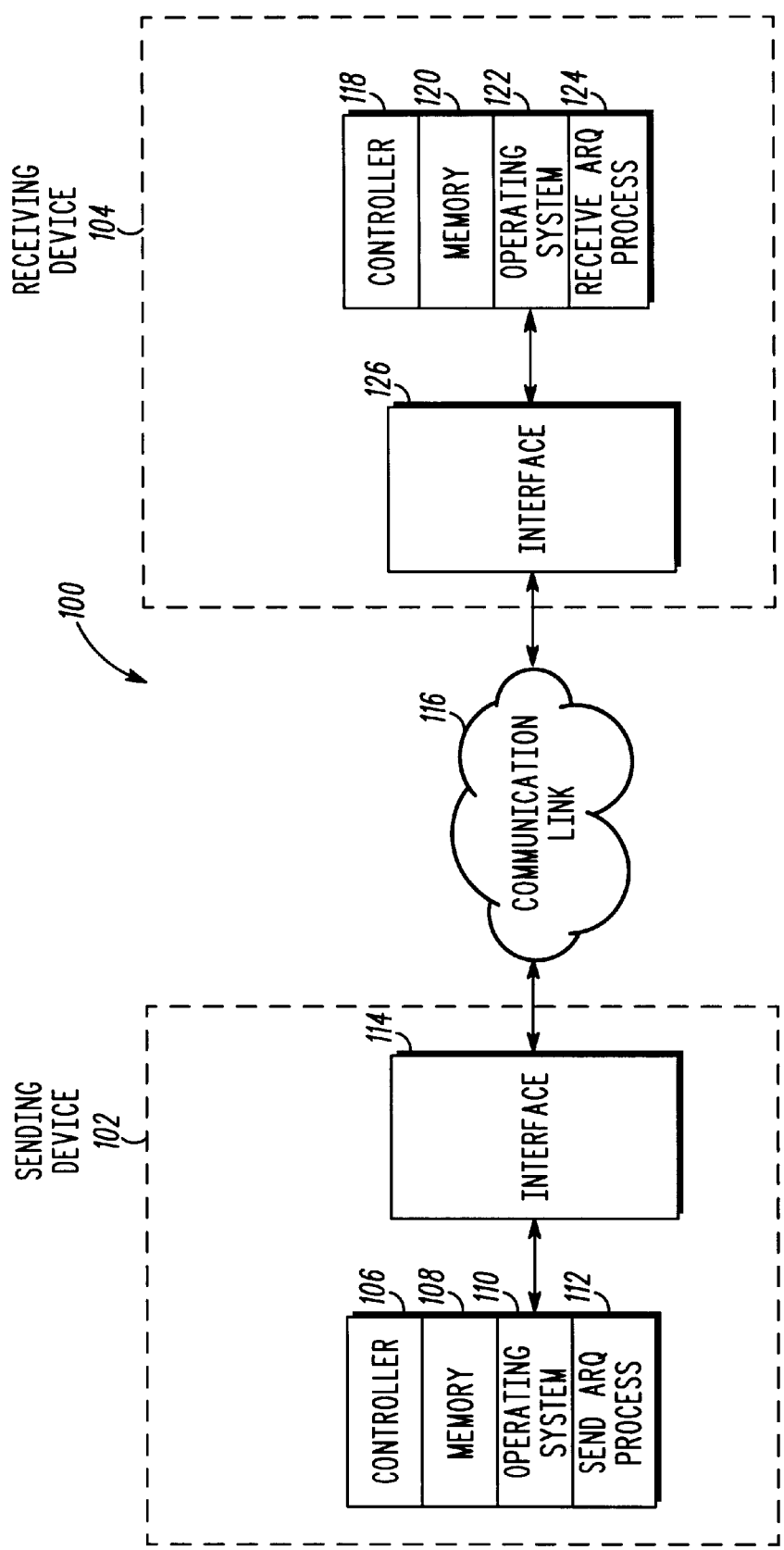
FIG. 1 is a diagram of a communication system using an ARQ protocol in accordance with the present invention.

The following describes an ARQ protocol with the following characteristics:
1. Allows a transmitter to unilaterally terminate an attempt to transfer one or more blocks, and communicate this event to a receiver in a straightforward and robust fashion;
2. Allows a receiver to unilaterally terminate an attempt to receive one or more blocks, and communicate this event to the sender in a straightforward and robust fashion;
3. Can be operated with any data transfer reliability/data transfer delay performance characteristic, ranging from perfect reliability/maximum potential delay to maximum potential unreliability/minimum delay. The performance is dynamically changeable by either the transmitter or receiver.
4. Provides mechanisms by which the transmitter and receiver can dynamically increase bandwidth consumption and decrease aggregate block transfer delay (and vice-versa).
5. Supports continuous transmission of data blocks by the transmitter.
6. Facilitates ARQ message piggybacking.
7. Efficiently supports block transfer over high transfer rate, high delay links.
8. Efficiently supports links subject to burst errors.

In one embodiment of the present invention, there is provided a method of sending a plurality of blocks comprising data. The method comprises generating a first message comprising at least one block of the plurality of blocks, an identification of the at least one block, and an identification of a first active send block of the plurality of blocks, wherein the at least one block appears in the plurality of blocks no earlier than the first active send block; and sending the first message from a sending device to a receiving device.

In another embodiment of the present invention, there is provided a method including steps of maintaining a send block transfer window associated with a sending device and maintaining a receive block transfer window associated with a receiving device. The send block transfer window identifies a plurality of blocks adapted to be transferred from the sending device to a receiving device and the receive block transfer window identifies a plurality of blocks adapted to be received by the receiving device. The sending device forms a Send ARQ message field including a send anchor field and a send sequence number field. The send anchor field identifies a most delayed block of the plurality of blocks identified in the send block transfer window and the send sequence number field identifies a current block of the plurality of blocks identified in the send block transfer window that is to be sent from the sending device to the receiving device. The sending device forms a data transfer request message including, in sequence, the send anchor field, the send sequence number field, and a block data field including data associated with the current block and then sends the data transfer message to the receiving device.

In still another embodiment of the present invention, there is provided a method wherein a sending device attempts transfer of a plurality of blocks of data to a receiving device. The receiving device designates at least a first block of the plurality of blocks as corrupt and reports a number of consecutive blocks of the plurality of blocks as corrupt, commencing with the first block. The number of consecutive blocks reported as corrupt include an allowable number of non corrupt blocks based on a predefined parameter.

Turning now to the drawings and referring initially to FIG. 1, there is shown a communication system 100 comprising a sending device 102 and a receiving device 104. It is to be understood that in a typical data communication system, each of the devices 102 and 104 may act either as sender, receiver, or both, depending on whether they are sending and/or receiving data. Sending device 102 includes a controller 106, which may comprise a Central Processor Unit ("CPU"), microprocessor or other control means, memory 108, operating system 110, and Send ARQ Process 112. Receiving device 104 includes a controller 118, which may comprise a Central Processor Unit ("CPU"), microprocessor or other control means, memory 120, operating system 122, and Receive ARQ Process 124.

The controller 106 runs the operating system 110 of the sending device 102. In addition, the controller 106 runs the Send ARQ Process 112 to manage ARQ error control for the sending device 102. Similarly, the controller 118 runs the operating system 122 and the Receive ARQ Process 124 for the receiving device 104. The sending and receiving devices 102, 104 communicate via communication link 116 which may comprise, for example, terrestrial wired or wireless links, satellite links or a combination thereof. The communication link 116 may cause errors in the information and status messages exchanged between the sending and receiving devices 102, 104 but is otherwise adapted for the transfer of a delay-sensitive data stream such as that generated by an audio or video source. The sending and receiving devices 102 and 104 interface with the communication link 116 through respective communication interfaces 114, 126. The communication interfaces 114, 126 may comprise, for example, modems or other means for interfacing between the sending and receiving devices 102, 104 and the communication link 116.

Generally, the sending and receiving devices 102, 104 may comprise sources or recipients of control messages and/or payload, including delay-sensitive audio or video payload. The communication devices 102, 104 may comprise, for example, wireline device(s), mobile or portable wireless radio units, base stations or repeaters, dispatch consoles, site controller(s), comparator(s), telephone interconnect device(s), internet protocol telephony device(s), call logger(s), scanner(s) and gateway(s).

The ARQ protocol assumes that the data flowing across the link 116 has been divided into a sequence of arbitrarily sized chunks of data called blocks. The Send and Receive ARQ Processes 112, 124 exchange ARQ messages to coordinate the transfer of data blocks from sending device 102 to receiving device 104. In one embodiment, the ARQ messages may be embedded within the data transfer request messages and thereby sent along with one or more data blocks between the communication devices 102, 104. There can be multiple, simultaneous, independent ARQ Instances, each comprising a Send and Receive ARQ Process, active in each direction. For convenience, messages generated by the Send ARQ Process 112 will be termed Send ARQ messages and messages generated by the Receive ARQ Process 124 will be termed Receive ARQ messages. The number of bits dedicated to each of the fields within the Send and Receive ARQ messages 112, 124 is an implementation decision and does not affect protocol operation. In a preferred embodiment, the Send and Receive ARQ messages are implemented in a compact form that permits piggybacking: a message carrying a Send ARQ message for a data stream flowing in one direction can also carry a Receive ARQ message for a data stream flowing in the other. This can lead to substantial gains in efficiency for full-duplex applications.

Operation of the Send and Receive ARQ messages is best described with reference to the block management arrays (BMAs) 202, 204 shown in FIG. 2. The BMAs contain information used by a sending communication device ("Sender") to transfer blocks to a receiving communication device ("Receiver"). The Sender and Receiver each maintain a BMA. The BMA used by the Sender is termed a "Send BMA" and the BMA used by the Receiver is termed a "Receive BMA." In a preferred embodiment, the length of the Send and Receive BMAs 202, 204 is fixed prior to operation of the ARQ protocol. Any BMA length can be selected depending on the ARQ protocol performance goals and the nature of the operating environment. The BMA length can be fixed by target system specification or can be negotiated between Sender and Receiver by some other protocol independent of the ARQ protocol.

As shown, the Send BMA 202 and Receive BMA 204 each include eight elements. Send BMA 202 includes, in order, element 206, element 208, element 210, element 212, element 214, element 216, element 218 and element 220 corresponding to eight send sequence numbers "0" through "7." Receive BMA 204 similarly includes, in order, element 222, element 224, element 226, element 228, element 230, element 232, element 234 and element 236, corresponding to the eight receive sequence numbers "0" through "7." In one embodiment, each element in a BMA contains a block state variable (BSV) indicating the current transfer status of a block and possibly the data comprising the block. For example, in one embodiment of the invention, the possible states for a send BSV can be "FREE", "NOT SENT", "SENT", "NACK", and "TERMINATED". The FREE state indicates that there is currently no block awaiting transfer to the Receiver. The NOT SENT state indicates that a block is awaiting transfer but a transfer attempt has not yet occurred. The SENT state indicates that a transfer attempt has occurred but no positive or negative acknowledgement has yet been received. The NACK state indicates that an unsuccessful transfer attempt has been made for the block. The TERMINATED state indicates that no further attempts to transfer the block to the receiver should be made. Likewise, in one embodiment of the invention, the possible states for a receive BSV can be "NOT RECEIVED", "CORRUPT", "RECEIVED", and "TERMINATED". The NOT RECEIVED state indicates that the block has been not yet been received from the Sender. The CORRUPT state indicates that the Receiver has detected that the Sender tried to transfer the block, but failed. The RECEIVED state indicates that the block has been successfully received from the Sender. Finally, the TERMINATED state indicates that further attempts to receive the block from the Sender should not be made.

In one embodiment, the Send ARQ Process maintains two indices into the Send BMA for managing the transfer of blocks to the Receive ARQ Process. The first index, called the leading index, points to the element where the next block received for transfer to the receiver should be inserted within the Send BMA 202. When the ARQ protocol according to this invention is first instantiated, the leading index points to Send BMA element 0 (FIG. 2, reference number 206). The Send ARQ Process will insert a new block ready for transfer to the receiver into Send BMA element 0, and then advance the leading index to the next element in the Send BMA 202. Subsequent blocks obtained for transfer will be handled in a similar manner. The Send BMA is a circular structure: the last element in the array relates to the first element in the array in the same way that element N relates to element N+1. Therefore, when the leading index advances past the last element of the Send BMA, it will wrap around to the beginning. The second index, called the send anchor, points to the element containing the oldest block obtained for transfer to the receiver. When the ARQ protocol is first instantiated, the send anchor index points to Send BMA 202 element 0 (206 in FIG. 2). As blocks are successfully transferred to the receiver, or terminated without being successfully transferred, the send anchor index advances. Like the leading index, when the send anchor index advances past the last element of the Send BMA 202 it will wrap around to the first element. The send anchor index and the leading index define a window into the Send BMA 202 containing those blocks which are actively being transferred to the receiver. This window is called the Send block transfer window (BTW). The ordering of blocks within the Send BTW directly corresponds to the order in which the blocks were obtained, with blocks obtained earlier appearing before blocks obtained later. The send anchor index defines the first active block within the Send BTW, and the block preceding the leading index defines the last active block within the Send BTW.

The Receive ARQ process maintains an index into the Receive BMA 204 called the receive anchor. The receive anchor points to the first element within the Receive BTW that the Receive ARQ process is still interested in filling with a block sent by the Send ARQ process. When the ARQ protocol according to this invention is first instantiated, the receive anchor points to element 0 within the Receive BMA 204 (222 in FIG. 2). As blocks are received from the Send ARQ process or terminated without being received by either Sender or Receiver, the receive anchor advances. When the receive anchor advances past the last element of the Receive BMA 204, it will wrap around to the first element. The receive anchor defines a window into the Receive BMA 204 called the Receive block transfer window (BTW).

Figure 2:
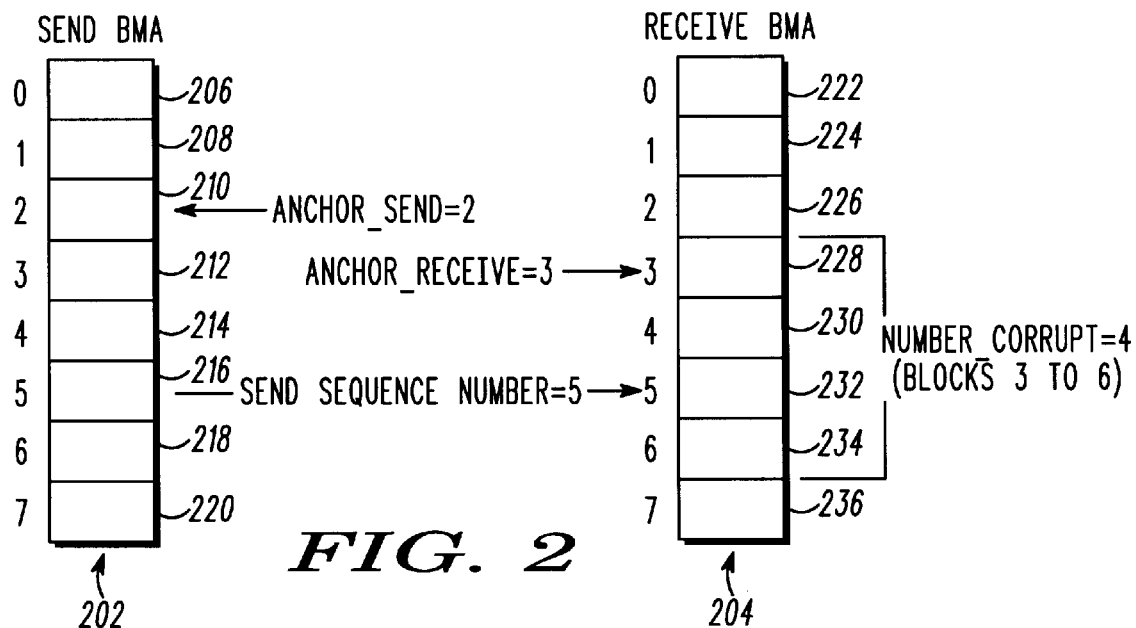
FIG. 2 is an illustration of an ARQ protocol according to the present invention operating on block management arrays managed by sending and receiving devices.
Figure 3A:
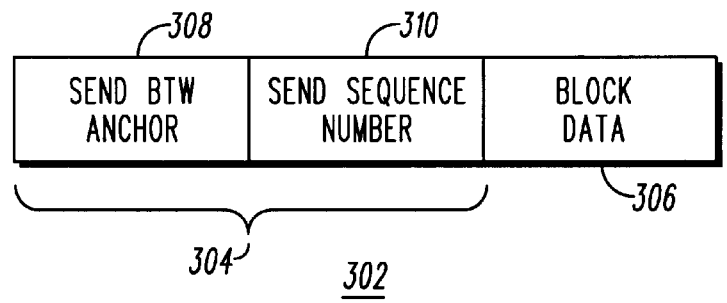
FIG. 3A shows the structure of a Send ARQ message sent from a sending device to a receiving device according to the present invention.

FIG. 3A shows the structure of a data transfer request message 302 according to one embodiment of the invention. As shown, the data transfer request message 302 comprises a Send ARQ message field 304 and a block data field 306. The Send ARQ message field 304 comprises a Send block transfer window anchor field 308 (hereinafter anchor send field 308) and a send sequence number field 310 (hereinafter SSN field 310). The SSN field identifies which block is currently being transferred from Sender to Receiver. In the example of FIG. 2, SSN=5, thus indicating that block 5 is currently being transferred from Sender to Receiver by the data transfer request message 302.

Figure 3B:
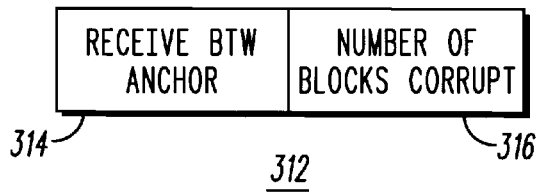
FIG. 3B shows the structure of a Receive ARQ message sent from a receiving device to a sending device according to the present invention.

FIG. 3B shows the structure of a Receive ARQ message 312 according to one embodiment of the invention. As shown, the Receive ARQ message 312 comprises a Receive block transfer window anchor field 314 (hereinafter anchor receive field 314) and a number of corrupt blocks field 316 (hereinafter number corrupt field 316). The number corrupt field specifies the number of blocks starting from the receive anchor that the Receiver would like the Sender to mark as corrupt. In the example of FIG. 2, number corrupt=4, thus indicating that the Receiver would like blocks 3 to 6 of the Send BMA 202 to be marked as corrupt.

The ARQ procedure of the present invention may be characterized as a "joint" procedure because the Send and Receive ARQ Processes have joint control over the flow of blocks over the link. Neither the Send nor Receive ARQ Process is entirely a "slave" to its peer process. The ARQ procedure is characterized as "range" because it supports operation on a range of one or more blocks with a single message.

Figure 4:
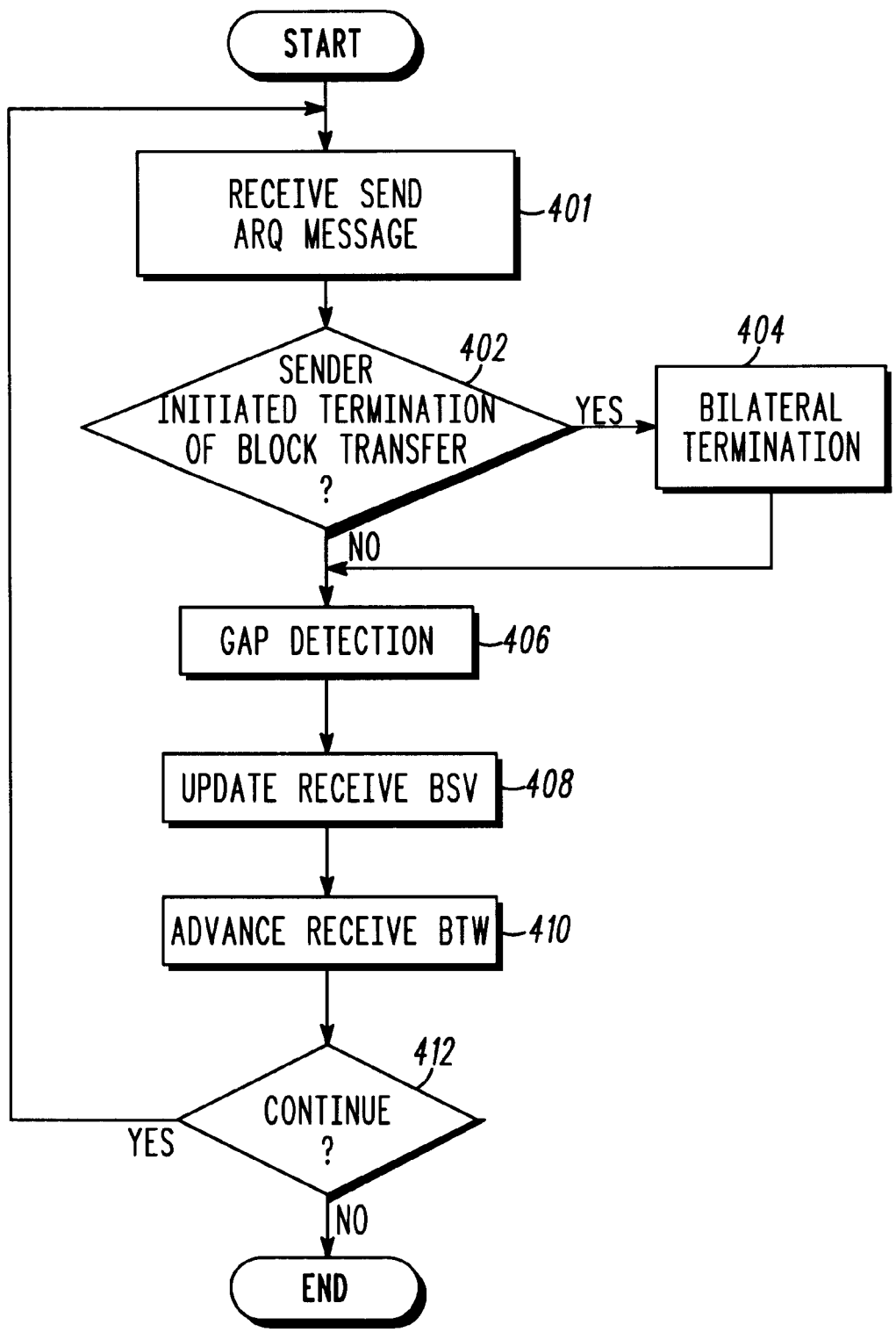
FIG. 4 illustrates a procedure for a receiving device to process an ARQ message from a sending device according to the present invention.

FIG. 4 illustrates a procedure for a Receiver to process a Send ARQ message received from a Sender. At step 401, the Receive ARQ Process of the Receiver receives a Send ARQ message from the Send ARQ Process of the Sender. At step 402, the Receive ARQ Process determines if the Send ARQ message indicates a Sender-initiated termination of a block transfer attempt. The Sender may wish to terminate a block transfer attempt, for example, if the transfer of a block or blocks is excessively delayed due to link errors. In one embodiment of the present invention, the Sender unilaterally initiates termination of a block transfer by simply advancing the block identified in the anchor send field. For example, assume that the Sender has previously sent an ARQ message with anchor send=2. Suppose now that the Sender wishes to terminate the transfer of block 2. The sender "advances" or changes the block identified in the anchor send field to the next oldest block that is not yet terminated or transferred successfully and generates another ARQ message. For example, the Sender may now generate and send an ARQ message with anchor send=3. This indicates to the Receiver that block 3 is now the first block of the Send BTW and block 2 is now "terminated." It will be appreciated that any number of blocks may be terminated in this fashion by advancing the Send BTW and sending an ARQ message to the Receiver identifying the new anchor send field. For example, the Sender might terminate the transfer of blocks 2, 3 and 4 by advancing the anchor send field from 2 to 5, and so forth.

The Receive ARQ Process may make the determination at step 402 by comparing the latest reported position of the Send BTW to the current position of the Receive BTW. In one embodiment, the latest reported position of the Send BTW can lead the current position of the Receive BTW only if the Sender has unilaterally terminated a block or blocks and has advanced its Send BTW accordingly. In response to a positive determination at step 402, the Receive ARQ Process proceeds to Step 404 where it advances its Receive BTW in corresponding fashion to match the Send BTW, thereby performing a "bilateral termination" of the appropriate block or blocks.

Figures 5, 6:
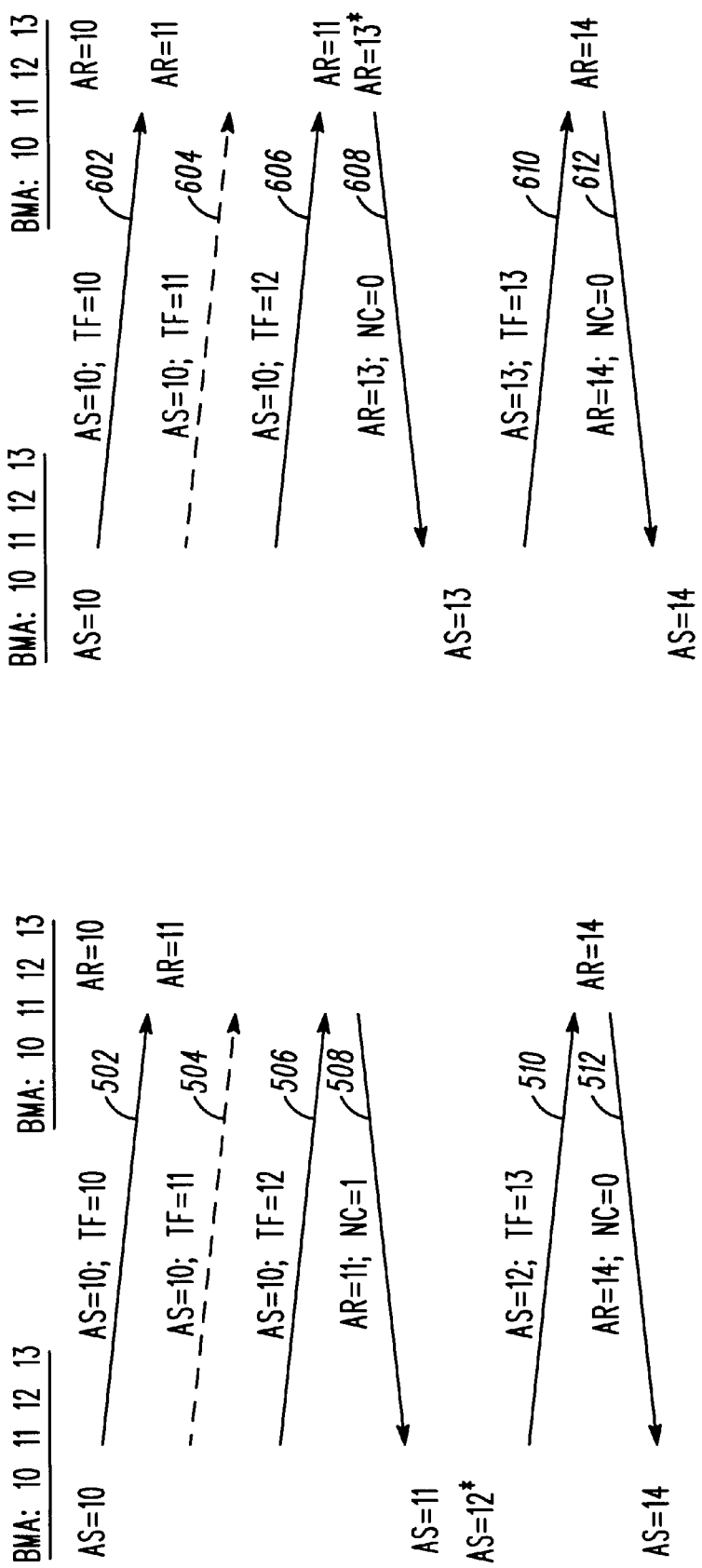
FIG. 5 is a message sequence chart associated with termination of a block transfer attempt initiated by a sending device using the ARQ protocol according to the present invention.
FIG. 6 is a message sequence chart associated with termination of a block transfer attempt initiated by a receiving device using the ARQ protocol according to the present invention.

An example message sequence chart associated with a bilateral termination initiated by the Sender is shown at FIG. 5. The example assumes that blocks 0 to 9 have already been transferred successfully and that the Sender has blocks 10 to 13 awaiting transfer to the Receiver. The following sequence of events is shown:

1. With the send anchor at block 10, the Sender attempts to transfer blocks 10 to 12, in sequence, to the Receiver via Send ARQ messages 502, 504, 506. Blocks 10 and 12 are transferred successfully, as illustrated by a solid line for message 502 and 506; block 11 transfer fails, as indicated by a dotted line for message 504. The Receive ARQ Process advances its receive anchor to 11 after the successful receipt of block 10. When block 12 is successfully received, Receive ARQ Process marks block 11 as corrupt.
2. The Receive ARQ Process transfers a Receive ARQ message 508 indicating that block 11 is corrupt.
3. The Send ARQ Process advances the send anchor to block 11 based on the new reported position of the receive anchor. The Send ARQ Process marks block 11 as negatively acknowledged.
4. The Sender decides to abandon further block 11 transfer attempts after receiving the negative acknowledgement. The Send ARQ Process unilaterally advances the send anchor to block 12, and transfers block 13 using a Send ARQ message 510 carrying the advanced send anchor.
5. The Receive ARQ Process notes the advanced send anchor reported in Send ARQ message 510 and advances the receive anchor to block 12. The successful receipt of block 13 causes a further advance of the receive anchor to block 14.

6. The Receiver transfers a Receive ARQ message 512 indicating the updated position of the receive anchor.
7. The Send ARQ Process advances the send anchor to block 14 in response to the newly reported position of the receive anchor.

Upon completing the bilateral termination, or in response to a negative determination at step 402 (FIG. 4), the Receive ARQ Process proceeds to step 406 to perform a "gap detection" procedure whereby any missing blocks that should have been received are designated as corrupt. For example, the Receive ARQ process may conclude that any missing blocks in the Receive BMA between anchor send and SSN are corrupt. This is because, in one embodiment, the Send ARQ Process must attempt to send all preceding blocks before sending the block indicated by SSN, thus the Receive ARQ Process can conclude that any missing block (s) in the Receive BMA is corrupt. Thus, for example, if the Receiver receives a Send ARQ message with anchor send=2 and SSN=5, it will designate blocks 2, 3 and 4 as corrupt if they were not previously received because the Receiver knows that blocks 2, 3 and 4 should have been received before block 5.

Next, at step 408, the Receive ARQ Process updates the Receive BSV. This is performed in one embodiment by identifying the block in the Receive BMA specified by the Send ARQ message SSN field as either received or corrupt, depending upon the condition of the block payload associated with the Send ARQ message. For example, if the Receiver receives a Send ARQ message with SSN=5, the Receive ARQ Process may identify block 5 as received if the data associated with block 5 is received in good condition, or corrupt if the data is received in bad condition. It will be appreciated, however, for implementations where the block data is not protected separately from the Send ARQ message, the Receive ARQ Process may only be able to identify the block as received in good condition.

At step 410, the Receive ARQ Process advances the Receive BTW. In one embodiment, the Receive ARQ Process advances its Receive BTW past blocks that are either received or terminated, such that the anchor receive field identifies the first block in the Receive BMA that is either corrupt or not received. Thus, for example, where anchor receive=3, if block 3 is received or terminated and block 4 is corrupt or not yet received, the Receive ARQ Process will advance the anchor receive field to block 4.

The Receive ARQ Process may initiate an optional, unilateral termination of a block transfer attempt at any time. The Receiver may wish to unilaterally terminate a block transfer attempt, for example, if the block or blocks are excessively delayed due to transfer errors. In one embodiment of the present invention, the Receiver initiates unilateral termination of a block transfer by simply advancing its Receive BTW past the block to be terminated and generating a Receive ARQ message with the anchor receive field indicating the new Receive BTW position. For example, with reference to FIG. 2, note that the anchor receive block 3 differs from the anchor send block 2. This indicates that the Receiver has advanced the anchor receive block from 2 to 3, perhaps because block 2 was already received or that it was excessively delayed such that the Receiver no longer wishes to receive it. The Receiver generates and sends an ARQ message with anchor receive=3. This indicates to the Sender that block 3 is now the first block of interest to the Receiver. It will be appreciated that any number of blocks may be terminated in this fashion by means of a single ARQ message. For example, the Receiver might terminate the transfer of blocks 2, 3 and 4 by advancing the anchor receive field from 2 to 5, and so forth. The Send ARQ Process, in turn, will advance its Send BTW in corresponding fashion to match the Receive BTW, thereby performing a bilateral termination of the appropriate block or blocks.

An example message sequence chart associated with a bilateral termination initiated by the Receiver is shown at FIG. 6. The example assumes that blocks 0 to 9 have already been transferred successfully and that the Sender has blocks 10 to 13 awaiting transfer to the Receiver. The following sequence of events is shown:

1. With the send anchor at block 10, the Sender attempts to transfer blocks 10 to 12, in sequence, to the Receiver via Send ARQ messages 602, 604, 606. Blocks 10 and 12 are transferred successfully, as illustrated by a solid line for message 602 and 606; block 11 transfer fails, as indicated by a dotted line for message 604. The Receive ARQ Process decides that it is no longer interested in receiving block 11 and unilaterally advances the receive anchor to block 12. Since block 12 has already been successfully received, the receive anchor is further advanced to block 13.
2. The Receive ARQ Process transfers a Receive ARQ message 608 indicating the new position of the receive anchor and that no blocks are corrupt.
3. The Send ARQ Process advances the send anchor to block 13 based on the new reported position of the receive anchor.
4. The Sender transfers block 13 using a Send ARQ message 610 carrying the advanced send anchor.
5. The Receiver acknowledges the successful receipt of block 13 by advancing the receive anchor to block 14 and transferring a Receive ARQ message 612 indicating the updated position of the receive anchor.
6. The Send ARQ Process advances the send anchor to block 14, aligning it with the updated receive anchor reported in the Receive ARQ message 612.

The process of FIG. 4 may be continued to process multiple Send ARQ messages. If the process is continued at step 412, the process returns to step 401 where the Receive ARQ Process receives another Send ARQ message from the Send ARQ Process, and so forth. Otherwise, if the process is not continued at step 412, the process ends.

Figure 7:
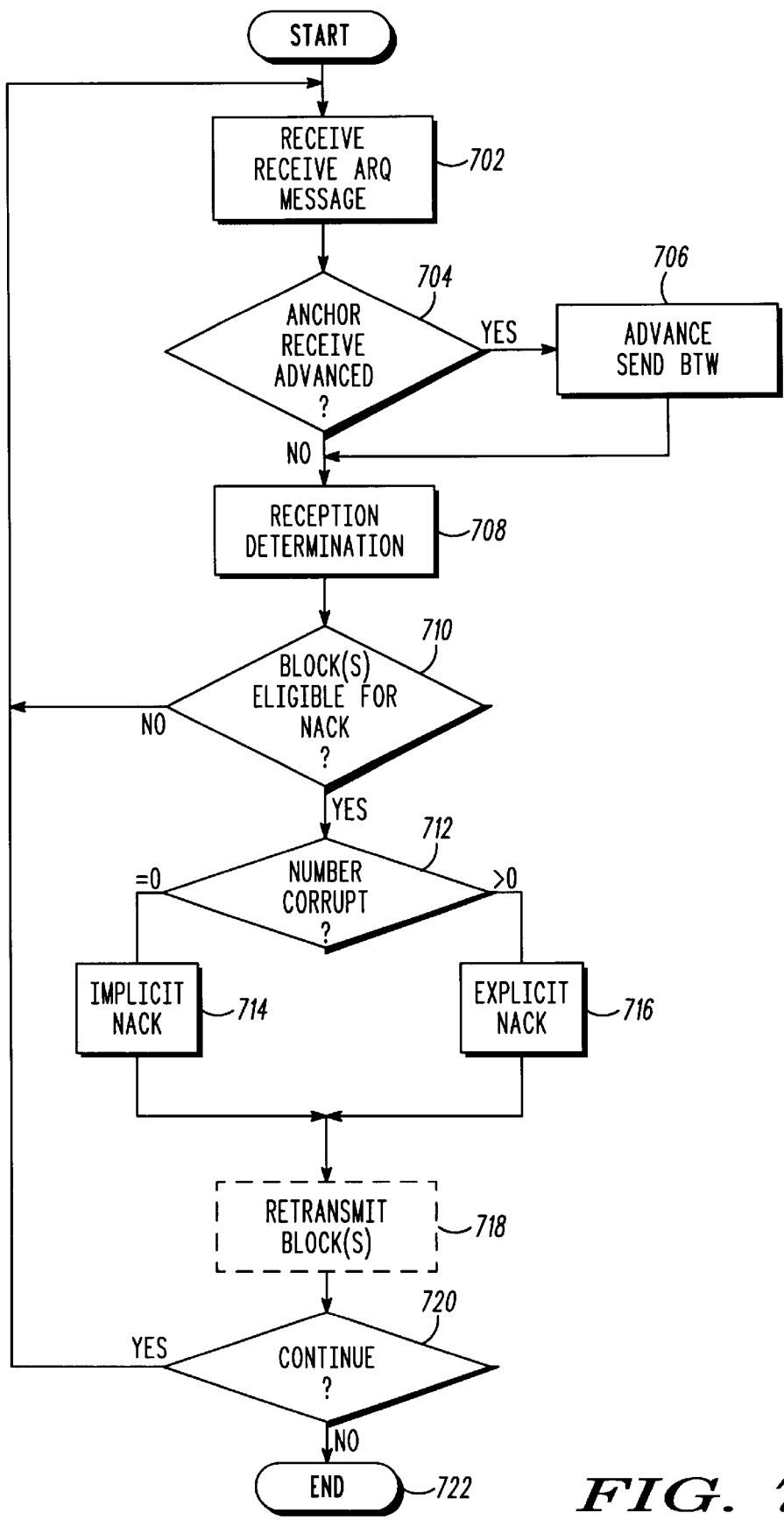
FIG. 7 illustrates a procedure for a sending device to process an ARQ message from a receiving device according to the present invention.

FIG. 7 illustrates a procedure for the Sender to process a Receive ARQ message transferred from the Receiver. At step 702, the Send ARQ Process receives a Receive ARQ message from the Receive ARQ Process. At step 704, the Send ARQ Process determines whether the anchor receive field within the Receive ARQ message has advanced. If the anchor receive field has advanced, the Send ARQ Process advances its Send BTW at step 706. Thus, for example, with reference to FIG. 2, where the anchor send field of the Send ARQ Process initially identifies block 2 and a Receive ARQ message is received with anchor receive=3, the Send ARQ Process will advance the anchor send field to block 3.

Upon advancing the Send BTW, or in response to a negative determination at step 704, the Send ARQ Process proceeds to step 708, where a reception determination procedure is performed to decide which blocks in the Send BTW are eligible to be negatively acknowledged by the Receive ARQ message. For example, if a particular block is sent by the Send ARQ Process at time t=1000 over a link with a propagation delay of d=200, then a Receive ARQ message received by the Send ARQ Process at t=1050 cannot possibly reflect the reception status of this block. There are a variety of methods by which Receive ARQ message coverage can be determined. Example reception determination procedures that may be used are shown at Appendix A, "Automatic Repeat Request (ARQ) Protocol; Reception Determination Procedures," by Stephen Hershey. Appendix A is appended to and is incorporated in its entirety as a part of the present disclosure. It will be appreciated, however, the ARQ protocol according to the present invention does not require any particular method of reception determination.

If it is determined at step 710 that a certain block or blocks are eligible for negative acknowledgement by the Receive ARQ message, the process proceeds to step 712 and steps 714 or 716 to determine whether the Send ARQ Process should negatively acknowledge (NACK) the eligible block or blocks. In one embodiment, the ARQ protocol defines two methods for marking blocks as negatively acknowledged: Explicit NACK and Implicit NACK. If it is determined at step 710 that a certain block or blocks are not eligible for negative acknowledgement, the process returns to step 702 to receive additional Receive ARQ messages, advance Send BTW, and so forth but block(s) are not negatively acknowledged until such time that they are determined at step 710 to be eligible for negative acknowledgement.

At step 712, the Send ARQ Process examines the number of corrupt blocks reported in the Receive ARQ message. If the number corrupt=0, an Implicit NACK procedure is performed at step 714. In the Implicit NACK procedure, the Send ARQ Process can negatively acknowledge block(s) even though it has not received a Receive ARQ message indicating that those block(s) are corrupt. The Implicit NACK procedure can provide significant efficiency gains when a long sequence of consecutive blocks are corrupted, such as during fading over wireless links. However, the Implicit NACK procedure relies upon a reception determination procedure able to estimate which sent blocks should have been received and positively acknowledged by the Receive ARQ Process.

Figures 8, 9:
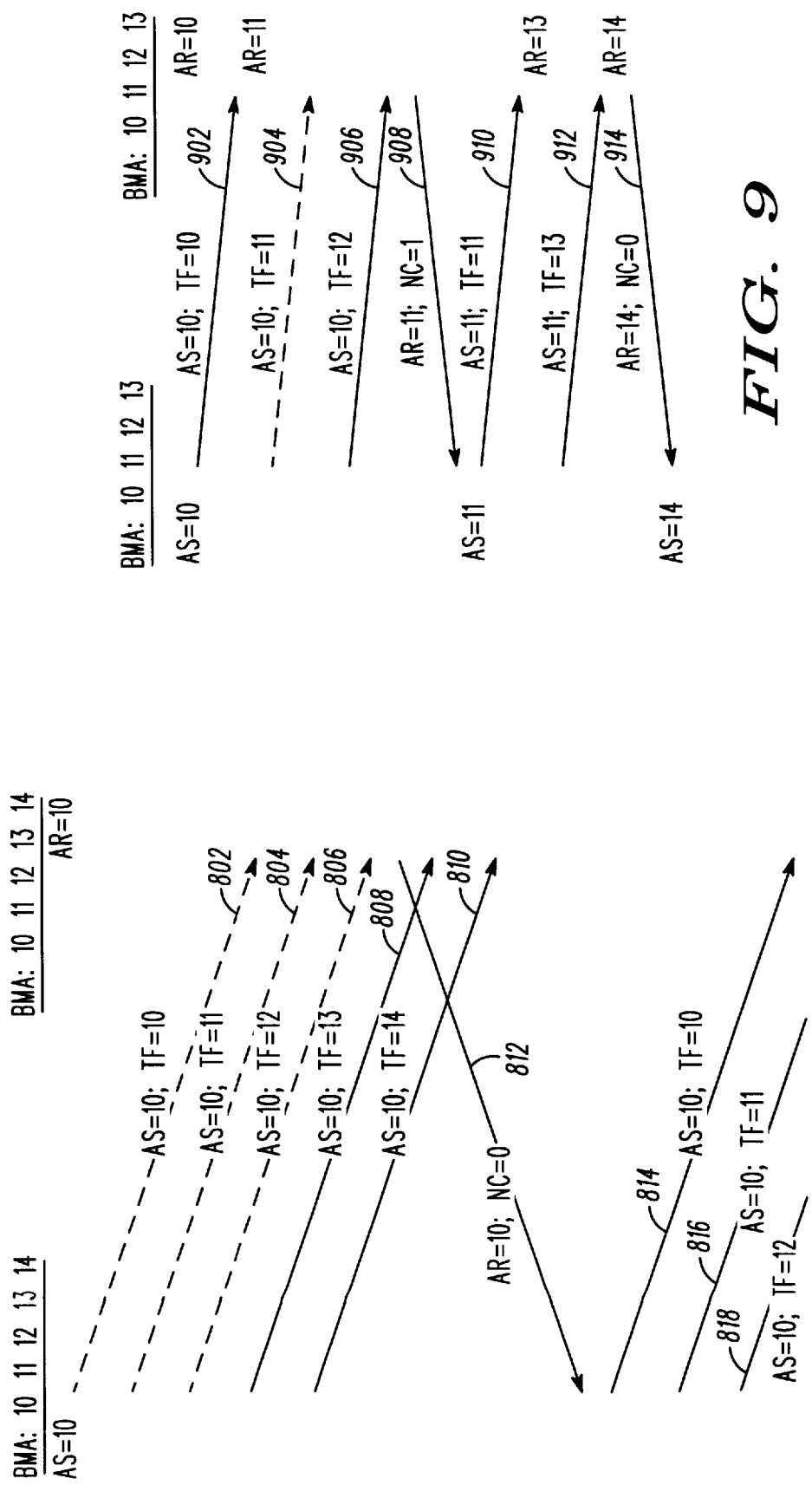
FIG. 8 is a message sequence chart associated with an Implicit NACK procedure using the ARQ protocol according to the present invention.
FIG. 9 is a message sequence chart associated with an Explicit NACK procedure using the ARQ protocol according to the present invention.

An example message sequence chart associated with the Implicit NACK procedure is shown at FIG. 8. The example assumes that blocks 0 to 9 have already been transferred successfully. The following sequence of events is shown:

1. With the send anchor at block 10, the Sender attempts to transfer blocks 10 to 14, in sequence, to the Receiver via Send ARQ messages 802, 804, 806, 808, 810. Blocks 10, 11 and 12 are not transferred successfully, as illustrated by a dotted line for messages 802, 804 and 806. However, the Receive ARQ Process cannot mark these blocks as corrupt until block 13 is successfully received.

2. After the hypothetical receipt time of block 12, the Receiver transfers a Receive ARQ message 812 indicating that the receive anchor has not advanced and that no blocks are corrupt. When block 13 is successfully received, Receive ARQ Process Gap Detection marks blocks 10, 11, and 12 as corrupt. However, by the time block 13 is received, the Receive ARQ message has already been generated and transferred to the Sender. Block 14 is also successfully received.

3. The Send ARQ Process reception determination algorithm determines which blocks are eligible for negative acknowledgement, and blocks 10, 11, and 12 are marked as negatively acknowledged.

4. The Send ARQ Process retransmits blocks 10, 11 and 12 to the Receiver, via Send ARQ messages 814, 816, 818.

Returning to FIG. 7, if the number corrupt is greater than zero, an Explicit NACK procedure is performed at step 716. The Send ARQ Process examines the number of consecutive blocks specified by number corrupt and starting at anchor receive. Those blocks within the range of blocks reported as corrupt that are eligible for negative acknowledgement by the Receive ARQ message are marked as such.

An example message sequence chart associated with an Explicit NACK procedure is shown at FIG. 9. The example assumes that blocks 0 to 9 have already been transferred successfully. The following sequence of events is shown:

1. With the send anchor at block 10, the Sender attempts to transfer blocks 10 to 12, in sequence, to the Receiver via Send ARQ messages 902, 904, 906. Blocks 10 and 12 are transferred successfully, as illustrated by a solid line for message 902 and 906; block 11 transfer fails, as indicated by a dotted line for message 904. The Receive ARQ Process advances its receive anchor to block II after the successful receipt of block 10. When block 12 is successfully received, the Receive ARQ Gap Detection Process marks block 11 as corrupt.

2. The Receive ARQ Process transfers a Receive ARQ message 908 indicating the new position of the receive anchor and that block 11 is corrupt.

3. The Send ARQ Process advances the send anchor to block 11 based on the new reported position of the receive anchor. After reception determination, the Send ARQ Process marks block 11 as negatively acknowledged and retransmits block 11 via Send ARQ message 910 carrying the advanced send anchor. The Send ARQ then transfers block 13 via Send ARQ message 912.

4. The Receive ARQ Process advances its receive anchor to 12 after the successful receipt of block 11, and then further advances the receive anchor to block 13 since block 12 was already received. The successful receipt of block 13 causes the receive anchor to advance to block 14.

5. The Receive ARQ Process transfers a Receive ARQ message 914 indicating the new position of the receive anchor and that no blocks are corrupt.

6. The Send ARQ Process advances the send anchor to block 14 based on the new reported position of the receive anchor.

At step 718 (FIG. 7), the Send ARQ Process optionally attempts to retransmit those block(s) that were negatively acknowledged by the Implicit NACK or Explicit NACK procedure. The process of FIG. 7 may be continued for the Sender to receive and process multiple Receive ARQ messages. If the process is continued at step 720, the process returns to step 702 where the Send ARQ Process receives another Receive ARQ message from the Receive ARQ Process, and so forth. Otherwise, if the process is not continued at step 720, the process ends at step 722.

Adjustable Minimum Corruption Density

The number corrupt field within the Receive ARQ message identifies the number of consecutive blocks that are reported as corrupt, starting from the first block within the receive BTW. According to one embodiment of the present invention, the number of blocks reported as corrupt may include a percentage of blocks that are not actually corrupt, based on a parameter called Minimum Corruption Density (MCD). The MCD may vary from 0 to 1.0 and is dynamically changeable by the Receiver depending on the desired bandwidth consumption/block transfer delay performance characteristic. For example, if the MCD is 1.0, then every block within the range of blocks specified by the number corrupt field is actually corrupt. However, if the MCD is less than 1.0, then some of the blocks reported as corrupt may not be corrupt, but rather may have been received or terminated.

For example, if the MCD is 0.8, then 80% or more of the blocks within the range of blocks specified by the "number corrupt" field must be corrupt (thus 20% or less must have been received or terminated). If the MCD is 0.2, then only 20% or more of the blocks within the range of blocks specified by the "number corrupt" field must be corrupt, and so forth. The Receive ARQ Process reports the largest value for number corrupt that is consistent with the required MCD.

The Send ARQ Process, having received the Receive ARQ message with the number corrupt field and the anchor receive field, will mark the appropriate number of blocks as corrupt. For example, if the Receive ARQ message identifies anchor receive=3 and number corrupt=4, the Send ARQ Process may mark blocks 3 to 6 as corrupt after reception determination and subsequently attempt to retransmit those blocks. If the MCD is 1.0, all of the blocks that were reported as corrupt (and thus all of the blocks that are retransmitted) are actually corrupt. If the MCD is less than 1.0, some of the blocks that were reported as corrupt are not actually corrupt, thus the Sender will retransmit some blocks that were already been received or terminated, thereby increasing bandwidth consumption.

In general, if free excess bandwidth is available to absorb the increased and width demands resulting from an MCD less than 1.0, the transfer delay over the link will decrease. This is because lower values of MCD often result in larger values for number corrupt. Thus, one method by which the Receiver might manage the MCD parameter is to set the MCD to 1.0 during periods of congestion to minimize bandwidth consumption and to lower the MCD during less congested periods to increase bandwidth consumption but decrease delay. In any event, whatever MCD parameter is selected, it is preferred that the final block in the range reported as corrupt (i.e., farthest from the receive anchor) should always be actually corrupt, because including final blocks that were received successfully within the reported corruption range merely leads to unnecessary retransmissions with no corresponding reduction in aggregate block transfer delay.

Figure 10:
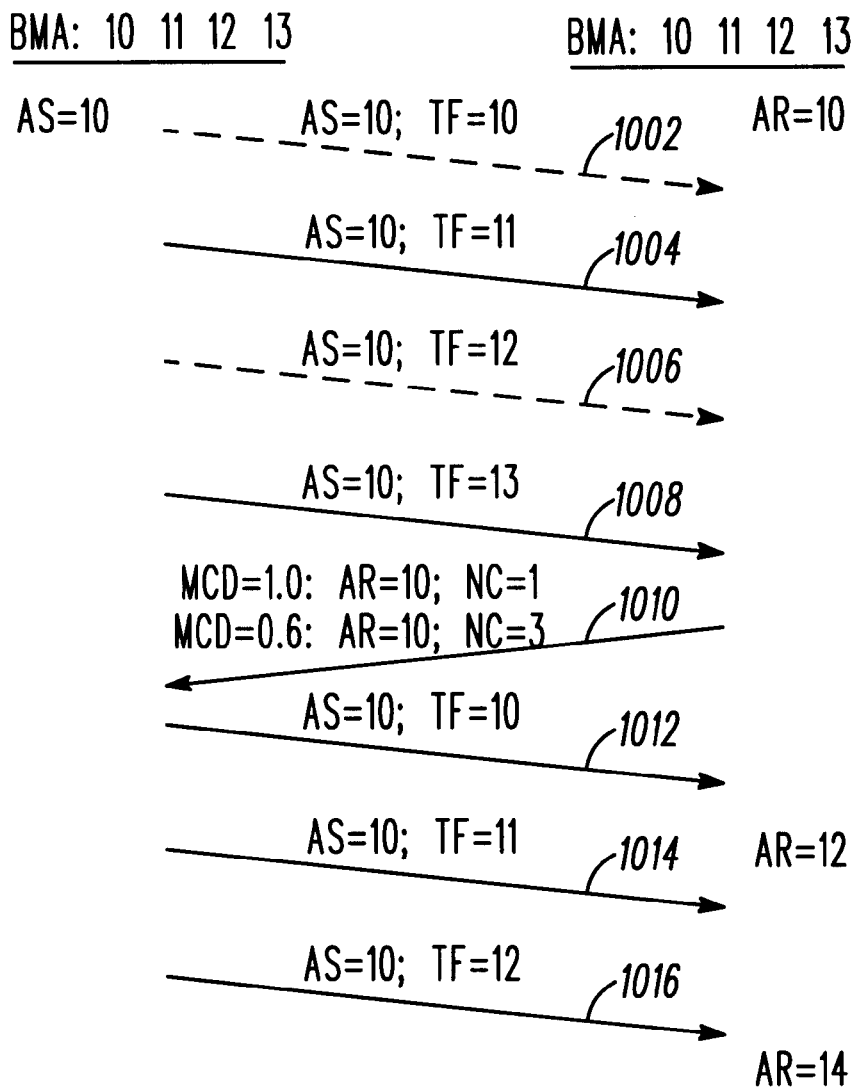
FIG. 10 is a message sequence chart associated with a Minimum Corruption Density feature of the ARQ protocol of the present invention.

FIG. 10 is a message sequence chart useful for illustrating the MCD feature of the present invention. The example assumes that blocks 0 to 9 have already been transferred successfully. The following sequence of events is shown:

1. The Sender attempts to transfer blocks 10 to 13, in sequence, to the Receiver via Send ARQ messages 1002, 1004, 1006, 1008. Blocks 10 and 12 were not transferred successfully; blocks 11 and 13 were transferred successfully.

2. The Receive ARQ Process transfers a Receive ARQ message 1010 indicating a number of corrupt blocks, based on the minimum corruption density (MCD). If the MCD is 1.0, then the Receive ARQ Process indicates only that block 10 is corrupt even though it knows that block 12 is also corrupt. This is because any larger reported number corrupt would include at least one block (block 11) that is not corrupt and therefore would be inconsistent with the MCD of 1.0. However, if the MCD is 0.6 (thereby requiring that at least 60% of the blocks reported as corrupt are indeed corrupt), the Receive ARQ Process can report the number of corrupt blocks as 3 because two out of the three blocks (blocks 10 and 12) are indeed corrupt. (The remaining message sequence assumes an MCD of 0.6).

3. The Sender retransmits blocks 10, 11, 12 that were reported as corrupt, via Send ARQ messages 1012, 1014, 1016. Even though block 11 has been already received correctly by the Receiver and would not be retransmitted if MCD =1, the advantage of lowering the MCD to 0.6 (and thereby reporting the number of corrupt blocks as three) is that the Send ARQ Process is notified that block 12 is corrupt earlier, and hence retransmits block 12 sooner than it otherwise would have if the number of corrupt blocks was reported as one. This reduces the aggregate block transfer delay. The tradeoff is the excess bandwidth consumption caused by unnecessary retransmissions of correctly received blocks (in this example, block 11). Thus, lowering the minimum corruption density can reduce aggregate block transfer delay at the cost of greater bandwidth consumption.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

APPENDIX A – Automatic Repeat Request (ARQ) Protocol; Reception Determination Procedures

Automatic Repeat Request (ARQ) Protocol; Reception Determination Procedures
Stephen Hershey
Version 1.1.1
April 4, 2000
© Motorola, Inc 2000.
All rights reserved.

Stephen Hershey  Page 2  04/07/00

Contents

1 SCOPE .................................................................................................................................. 3
2 REFERENCES ..................................................................................................................... 3
3 DEFINITIONS AND ABBREVIATIONS ........................................................................... 3
   3.1 DEFINITIONS ..................................................................................................................... 3
   3.2 ABBREVIATIONS ............................................................................................................... 3
4 INTRODUCTION ................................................................................................................ 3
5 ROUND-TRIP DELAY, OPEN-LOOP PROCEDURE ...................................................... 5
   5.1 PRINCIPLE OF OPERATION ................................................................................................. 5
   5.2 RTD-OL EXAMPLE .......................................................................................................... 5
   5.3 PERFORMANCE ................................................................................................................. 6
6 TRANSMIT COUNT PROCEDURE .................................................................................. 7
   6.1 PRINCIPLE OF OPERATION ................................................................................................. 7
   6.2 TXC EXAMPLE ................................................................................................................. 8
   6.3 PERFORMANCE ................................................................................................................. 8
7 ROUND-TRIP DELAY, CLOSED-LOOP PROCEDURE ................................................. 9
   7.1 PRINCIPLE OF OPERATION ................................................................................................. 9
   7.2 RTD-CL EXAMPLE ......................................................................................................... 10
   7.3 PERFORMANCE ............................................................................................................... 10
8 IMPLEMENTATION RECOMMENDATIONS ............................................................... 11
BIBLIOGRAPHY ...................................................................................................................... 12
HISTORY .................................................................................................................................. 13

Express Mailing Label No.: EJ923752498US

Stephen Hershey    Page 3    04/07/00

1 Scope

This document describes reception determination methods compatible with modern Automatic Repeat Request (ARQ) protocols.

2 References

[1] Hershey, S.; Joint Range Reject (JRR) Automatic Repeat Request (ARQ) Protocol; Technical Specification

3 Definitions and Abbreviations

3.1 Definitions

For the purposes of the present document, the following definitions apply:

ARQ Instance: a Receive and Send ARQ Process which exchange messages (Protocol Data Units) in order to co-ordinate the transfer of data blocks between peer entities.
ARQ Process: an entity created to manage one end of a peer-to-peer ARQ protocol. An ARQ Process can be further characterized as either a Send ARQ Process or a Receive ARQ Process.
Block: an indivisible fixed-length sequence of bytes. Block data is always completely transparent to the ARQ Instance handling it.
Protocol Data Unit: a formatted message sent between peer processes
Receiver: all Receive-side processes and procedures, including the Receive ARQ Process
Sender: all Send-side processes and procedures, including the Send ARQ Process

3.2 Abbreviations

For the purposes of the present document, the following abbreviations apply:

| | |
|---|---|
| ACK | Acknowledge |
| ARQ | Automatic Repeat Request |
| CL | Closed-Loop |
| C(R) | Receive Transmit Count |
| C(S) | Send Transmit Count |
| LLC | Logical Link Control |
| MAC | Medium Access Control |
| MSC | Message Sequence Chart |
| N(R) | Receive Sequence Number |
| N(S) | Send Sequence Number |
| NACK | Negative Acknowledge |
| OL | Open-Loop |
| PDU | Protocol Data Unit |
| RD | Reception Determination |
| RTD | Round-Trip Delay |
| RX | Receive |
| TX | Transmit |
| TXC | Transmit Count |

4 Introduction

An ARQ protocol permits the receiver of a stream of data blocks to request the retransmission of data blocks either not received or received corrupted from the sender. Figure 1 shows a typical data link employing an ARQ protocol in each data flow direction. An ARQ Instance is composed of a Send and Receive ARQ Process. The Send and Receive ARQ Processes exchange ARQ PDUs to manage the transfer of data across the data link, as shown in Figure 2. There can be multiple, simultaneous, independent ARQ Instances active in each direction.

Express Mailing Label No.: EJ923752498US

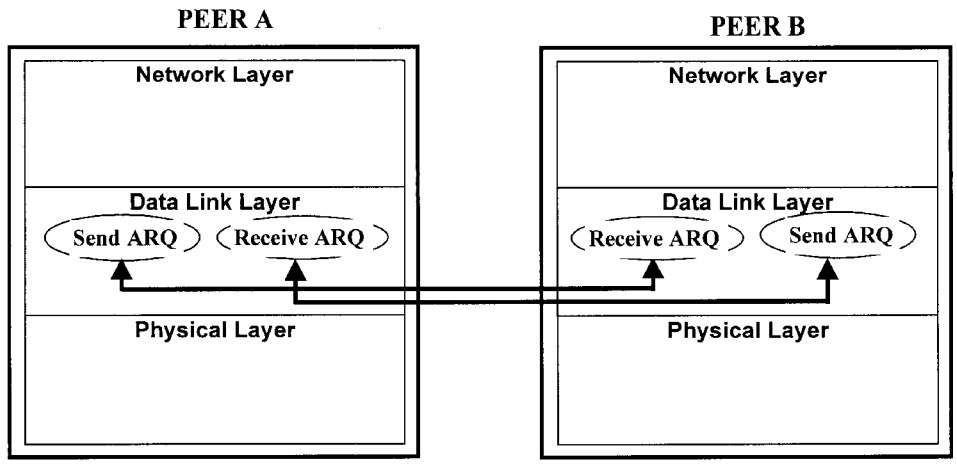

Figure 1. ARQ Within A Protocol Stack

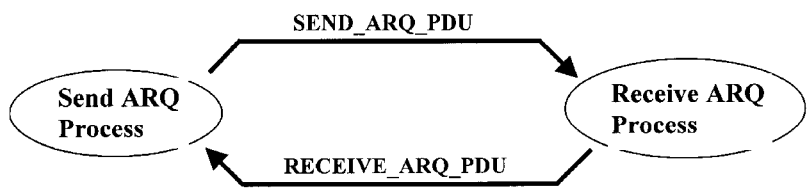

Figure 2. ARQ PDU Exchange

The efficient, reliable, high-speed data transfer over an error-prone wireless link has led to the development of state-based ARQ protocols. In a state-based ARQ protocol, the Receive ARQ Process merely reports the state of its block reception buffer. The reported state usually encompasses the reception states of multiple blocks. In contrast, in event-based ARQ protocols a Receive ARQ PDU is only generated in response to a particular event, such as the corruption of a block. The advantage of state-based ARQ protocols is that a Receive ARQ PDU can be built and sent at any time, permitting much more flexibility in scheduling Receive ARQ PDUs over the air. For example, in applications where a Receive ARQ PDU can be piggybacked on a MAC PDU containing a Send ARQ PDU and associated block payload, the Receiver can opportunistically piggyback Receive ARQ PDUs on outgoing sent blocks. This results in a net reduction in block transfer delay.

Reception determination is necessary in ARQ protocols where the Send and Receive ARQ Process can asynchronously build and send an ARQ PDU. The Send ARQ Process must determine which outstanding sent blocks are eligible to be negatively acknowledged by a Receive ARQ PDU. For example, if a Send ARQ PDU and associated data block are sent at time t=1000, and a Receive ARQ PDU is received at t=1050 reporting the block as corrupt, then the Sender must decide whether the block sent should be considered negatively acknowledged. If the actual round-trip delay was 20, then the Receive ARQ PDU accurately reflects the current state of the block and the block should be negatively acknowledged. If the actual round-trip delay is 200, then the Receive ARQ PDU cannot possibly reflect whether the block transfer at t=1000 was successful. Therefore, the block should be left unacknowledged until a subsequent Receive ARQ PDU.

Express Mailing Label No.: EJ923752498US

Clause 5 describes the Round-Trip Delay, Open-Loop reception determination procedure. Clause 6 describes the Transmit Count reception determination procedure. Clause 7 describes the Round-Trip Delay, Closed-Loop procedure. Clause 8 provides some implementation recommendations. The examples given in clauses 5-7 do not represent the operation of any particular ARQ protocol, but are only intended to highlight reception determination operation.

5 Round-Trip Delay, Open-Loop Procedure

This clause describes the reception determination by open-loop round-trip delay (RTD-OL) procedure. A closed-loop version of the RTD procedure can be found in clause 8.

5.1 Principle of operation

The RTD-OL procedure does not require the addition of reception determination related fields to the Send or Receive ARQ PDUs. RTD-OL stores the transmission time of each block sent to the Receive ARQ Process. RTD-OL also notes the reception time of each Receive ARQ PDU. RTD-OL employs a round-trip delay threshold to determine which unacknowledged blocks are reflected within the Receive ARQ PDU and are thus candidates for negative acknowledgement. If a block has been sent too recently to be reflected in Receive ARQ PDU, it is left in the unacknowledged state until (at least) the next Receive ARQ PDU is received. Otherwise, it is eligible for negative acknowledgement by the Receive ARQ PDU.

5.2 RTD-OL Example

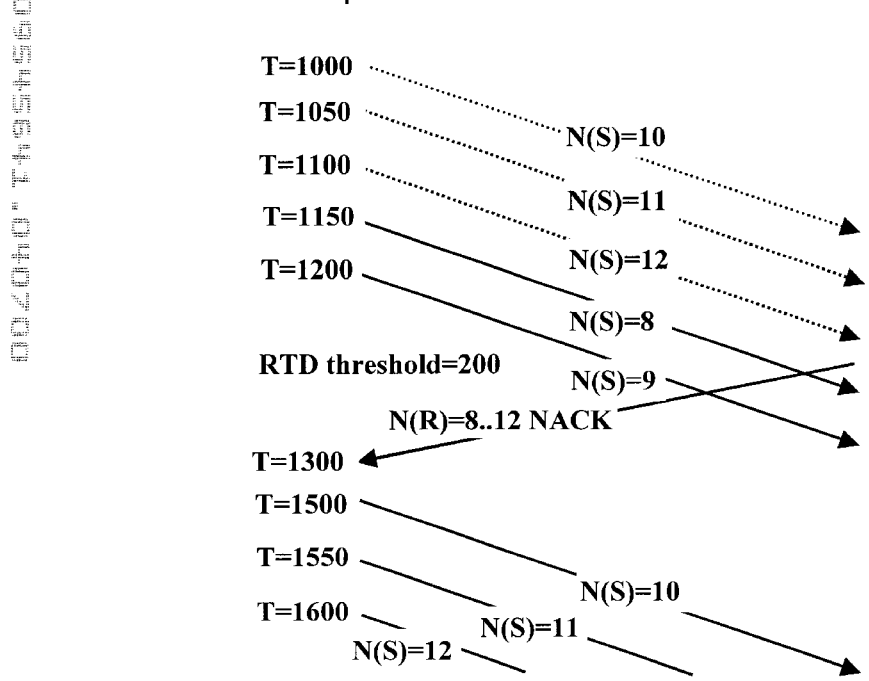

Figure 3. RTD-OL Reception Determination MSC

Figure 3 provides an example of the RTD-OL protocol in operation. The Send ARQ Process sends blocks 10, 11, 12, 8, and 9. Blocks 10, 11, 12 are not received correctly by the Receive ARQ Process; blocks 8 and 9 are received OK. The RTD-OL reception determination algorithm notes the transmission time of each block.

Express Mailing Label No.: EJ923752498US

The Receive ARQ Process sends a Receive ARQ PDU indicating that blocks 8 through 12 are corrupt. The PDU was sent too early to reflect the fact that blocks 8 and 9 were subsequently correctly received.

The Send ARQ Process reception determination algorithm uses the RTD threshold to calculate that blocks 8 and 9 were sent too recently to be reflected in the Receive ARQ PDU, and leaves them in the unacknowledged state. However, blocks 10 through 12 were sent sufficiently early and are marked as eligible for negative acknowledgement by the reception determination algorithm. The Send ARQ Process marks the blocks as negatively acknowledged and retransmits them.

5.3 Performance

The example given in subclause 5.2 is idealized in that the RTD threshold employed by the Send ARQ Process RTD-OL algorithm happened to correspond exactly to reception events at the Receiver. However, in most implementations the RTD threshold will not always exactly reflect Receiver reception events. For example, if the RTD threshold had been 100 in the RTD-OL MSC, then blocks 8 and 9 would have been negatively acknowledged and retransmitted, causing unnecessary bandwidth consumption. If the RTD threshold had been 300, then only block 10 would have been negatively acknowledged, causing unnecessary block transfer delay. Blocks 10 and 11 would not be marked as negatively acknowledged until a subsequent Receive ARQ PDU is received by the Send ARQ Process.

In general, if the RTD threshold is shorter than the actual round-trip delay, then RTD-OL may mark blocks as eligible for negative acknowledgement which were actually received correctly by the Receive ARQ Process but were not yet reflected in the Receive ARQ PDU. This can lead to non-optimal bandwidth consumption because the Send ARQ Process may unnecessarily retransmit the correctly received blocks. If there is available free bandwidth to absorb the unnecessarily retransmitted blocks, then no additional transfer delay results from the non-optimal bandwidth consumption. In fact, if there is available free bandwidth to absorb all excess retransmissions due to an excessively short RTD threshold, the block transfer delay will be lower. Some of the blocks retransmitted actually are corrupt and require retransmission, although the Receive ARQ PDU was generated too recently to properly reflect the state of these blocks.

If the RTD threshold is longer than the actual round-trip delay, then RTD-OL may mark blocks as ineligible for negative acknowledgement which are actually candidates for negative acknowledgement. These ineligible blocks are not retransmitted as promptly as they would have been had the RTD threshold been shorter, leading to increased block transfer delay but no increase in bandwidth consumption.

A disadvantage with the RTD-OL procedure is that on some links the instantaneous actual round-trip delay can vary widely due to dynamic changes in link operating conditions. This means that a fixed RTD threshold will not provide optimal bandwidth consumption and delay performance during all link operations. If the RTD threshold is fixed at the maximum theoretical round-trip delay, then block transfer delay performance will be sub-optimal because the actual round-trip delay will often be less than the RTD threshold. If the RTD threshold is fixed at the minimum theoretical round-trip delay, then bandwidth consumption will be sub-optimal because the actual round-trip delay will often be greater than the RTD threshold.

Link simulation or empirical studies can be used to obtain estimated round-trip delays for typical operating scenarios, and a RTD threshold can be selected based on these results to provide the desired bandwidth consumption – delay performance. For example, a RTD threshold could be selected so that 90% of the time the RTD threshold is equal to or longer than the actual round-trip delay, and 10% of the time the RTD threshold is too short. This would provide link performance favoring bandwidth preservation while allowing occaisonal deviations from the ideal to improve block transfer delay performance.

The RTD threshold can also be varied based on instantaneous link conditions. For example, during periods of light link congestion the RTD threshold can be shortened, causing RTD-OL to mark more blocks as eligible for negative acknowledgment and thus leading to more bandwidth consumption but less block transfer delay. During heavily congested periods, the RTD threshold can be lengthened, causing fewer blocks to be marked as eligible for negative acknowledgement. The Send ARQ Process will incorrectly mark fewer blocks as negatively acknowledged, thus conserving bandwidth.

Express Mailing Label No.: EJ923752498US

6 Transmit Count Procedure

6.1 Principle of operation

The transmit count (TXC) reception determination procedure requires the addition of a field to the Send ARQ PDU and a field to the Receive ARQ PDU. The Send ARQ PDU field is called the transmit count or C(S) field; the Receive ARQ PDU field is called the last_transmit_count or C(R) field. For the JRR ARQ protocol [1], the Send and Receive ARQ PDUs with TXC reception determination become:

```
typedef struct {
    int     anchor_send;
    int     transfer;
    int     transmit_count;    // added for TXC reception determination
} SEND_ARQ_PDU;

typedef struct {
    int     anchor_receive;
    int     number_corrupt;
    int     last_transmit_count;    // added for TXC reception determination
} RECEIVE_ARQ_PDU;
```

A transmit count is associated with each block sent. The transmit count indicates the transmission order of the block relative to other blocks sent. The Receive ARQ Process saves the last transmit count received, and echoes this value in each Receive ARQ PDU sent. The Send ARQ Process TXC reception determination procedure is able to unambiguously determine which sent blocks are subject to negative acknowledgement by a particular Receive ARQ PDU by noting the transmit count.

6.2 TXC Example

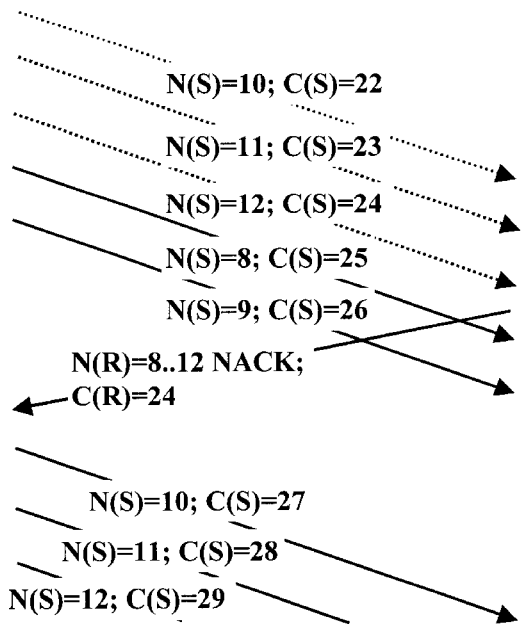

Figure 4. TXC Reception Determination MSC

Figure 4 provides an example MSC using the TXC reception determination algorithm. C(S) is the transmit count assigned to each block sent; C(R) is the last transmit count received by the Receive ARQ Process. The send sequence number N(S) and the transmit count C(S) are entirely independent entities. N(S) indicates the location of the block within the send transfer buffer, while C(S) indicates the transmission order.

In Figure 4, blocks 10, 11, 12, 8, and 9 are transmitted. The first three blocks have corrupt payloads, while blocks 8 and 9 are received correctly. The Receive ARQ Process reports the last received transmit count as 24 before blocks 8 and 9 are received. The Send ARQ Process reception determination algorithm is able to conclude based on the received transmit count that the Receive ARQ PDU does not reflect the reception of blocks 8 and 9 (which have later transmit counts), thus these blocks are left in the unacknowledged state.

6.3 Performance

The TXC reception determination algorithm provides optimal bandwidth consumption regardless of the instantaneous actual round-trip delay. However, in ARQ implementations where Implicit NACK [1] is an important negative acknowledgement mechanism (i.e. the Send ARQ PDU is not protected by an error detection mechanism separate from the block payload), TXC block transfer delay performance can suffer. For example, if a block tagged with a transmit count of C(S)=10 is successfully received, but blocks with transmit counts of C(S)=11 through C(S)=20 are all corrupt, then the Receive ARQ Process will report a C(R)=10 in the next Receive ARQ PDU. TXC reception determination will not mark any of the blocks with transmit counts of 11 through 20 as eligible for negative acknowledgement. In the same scenario, RXD-OL reception determination would mark some or all of the blocks as eligible for negative acknowledgement, depending upon the transmission times of the blocks and the current RTD threshold.

Express Mailing Label No.: EJ923752498US

7 Round-Trip Delay, Closed-Loop Procedure

This clause describes the reception determination by closed-loop round-trip delay (RTD-CL) procedure. An open-loop version of the RTD procedure can be found in clause 5.

7.1 Principle of operation

The RTD-CL procedure requires the addition of a single 1-bit reception determination related field to the Receive ARQ PDU, the duplicate receive flag field. For the JRR ARQ protocol [1], the Send and Receive ARQ PDUs with RTD-CL reception determination become:

```
typedef struct {
    int      anchor_send;
    int      transfer;
} SEND_ARQ_PDU;

typedef struct {
    int      anchor_receive;
    int      number_corrupt;
    boolean  duplicate_receive;    // added for RTD-CL reception determination
} RECEIVE_ARQ_PDU;
```

When the Receive ARQ Process receives a block which has already been correctly received, the Receive ARQ Process sets an internal "duplicate reception occurred" flag. When the Receive ARQ Process builds a new Receive ARQ PDU, it sets the Receive ARQ PDU duplicate receive flag to the current state of the duplicate reception occurred flag. The Receive ARQ Process then clears the duplicate reception occurred flag.

The RTD-CL procedure does not permit the sender to send a block more than once without reception result feedback from the receiver. Any duplicate reception detected by the receiver can thus only have resulted from the sender reception determination algorithm incorrectly deciding that the duplicated block was eligible for negative acknowledgement. The Receive ARQ Process uses the duplicate receive flag to signal the Send ARQ Process that its reception determination algorithm was overly aggressive in marking blocks as eligible for negative acknowledgement. The Send ARQ Process can then take corrective action based on this information.

The simplest corrective action available to the Send ARQ Process when the Receive ARQ Process reports a duplicate reception is to increment the RTD threshold. This reduces the number of blocks that the RTD reception determination procedure will mark as eligible for negative acknowledgement. By beginning with an RTD threshold of zero, an RTD threshold resulting in no excess bandwidth consumption can be found empirically. The RTD threshold will grow until the Send ARQ Process no longer receives duplicate reception notifications from the Receive ARQ Process. In contrast, the RTD-OL procedure requires the determination of the RTD threshold using a priori knowledge of the send and receive propagation and processing delays.

If there is extreme variation in the actual send and receive propagation and processing delays, then the RTD threshold may become quite large to reflect the worst-case round-trip delay experienced. This may be undesirable if occaisional excess bandwidth consumption can be tolerated in exchange for significantly reduced average block transfer delays. To solve this problem, the sender can become more aggressive in marking blocks as eligible for negative acknowledgement by periodically decrementing the RTD threshold. Meanwhile, the receiver uses the duplicate receive flag to make the sender less aggressive. By this mechanism, the RTD threshold dynamically varies to maintain the desired balance between excess bandwidth consumption and average block transfer delay. If the sender favors low block transfer delays over bandwidth preservation, the RTD threshold decrement period can be made small. Conversely, a large RTD threshold decrement period will favor bandwidth preservation over low block transfer delay.

Express Mailing Label No.: EJ923752498US

7.2 RTD-CL Example

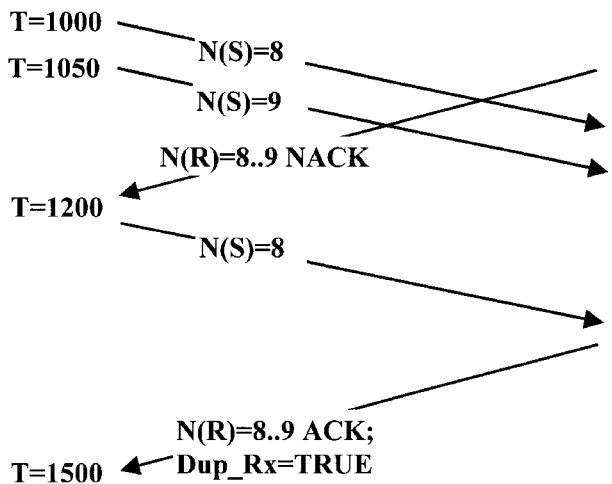

Figure 5. RTD-CL Reception Determination MSC

Figure 5 provides an example of the RTD-CL protocol in operation. The Send ARQ Process sends blocks 8 and 9. Before blocks 8 and 9 are received, the Receive ARQ Process negatively acknowledges the two blocks. An RTD threshold of 200 means that a block sent at T=1000 or earlier is eligible for negative acknowledgement. Therefore, RTD reception determination marks block 8, but not block 9, as eligible for negative acknowledgement. The Receive ARQ Process then incorrectly marks block 8 as negatively acknowledged. In reality, block 8 was sent too late to be reflected within the Receive ARQ PDU.

The Send ARQ Process retransmits block 8, and the Receive ARQ Process notes the duplicate reception of block 8. The subsequent Receive ARQ PDU carries the duplicate receive flag set to TRUE, indicating that a duplicate block reception occurred since the last Receive ARQ PDU was sent. Upon receipt of the Receive ARQ PDU, RTD-CL increments the RTD threshold to 225. If the scenario in the previous paragraph repeats again, the new RTD threshold of 225 will prevent the unnecessary retransmission of block 8.

7.3 Performance

RTD-CL empirically finds a value for the RTD threshold resulting in no excess bandwidth comsumption. In many cases, the RTD threshold found will be the smallest such value, minimizing block transfer delay. However, scenarios can be constructed where the RTD threshold found will not be the absolute smallest value, but will be close. For example:
• if the amount of the RTD threshold increment is large, then there may be a resolution-related error.
• for a high-delay return path, several Receive ARQ PDUs may be in transit, each carrying the duplicate receive flag set to TRUE. The Send ARQ Process will process these Receive ARQ PDUs in turn, causing multiple consecutive increments of the RTD threshold. The resulting RTD threshold may be larger than absolutely necessary for optimal bandwidth preservation.

Express Mailing Label No.: EJ923752498US

8 Implementation Recommendations

This clause provides some general reception determination implementation recommendations. These recommendations do not necessarily apply in all target operating environments, and should be independently verified using simulation or empirical studies.

The RTD-OL reception determination procedure is suitable when:
• sufficient information about the target operating environment is available so that the RTD threshold can be set appropriately for the desired block transfer delay-bandwidth consumption performance.
• the ability to dynamically reduce delay while increasing bandwidth consumption is desirable.
• ARQ PDUs must be maximally compact.
• the actual instantaneous send-to-receive and receive-to-send block transfer delays are not widely varying.

The TXC reception determination procedure is suitable when:
• bandwidth preservation is a high priority regardless of link load or other factors.
• an appropriate value for the RTD threshold cannot be found.
• larger ARQ PDUs can be tolerated.

The RTD-CL reception determination procedure is suitable when:
• sufficient information about the target operating environment is not available so that the RTD threshold can be set for optimal bandwidth preservation.
• excess bandwidth consumption is permissible while the algorithm finds the optimal RTD threshold.
• a maximally compact Send ARQ PDU and almost maximally compact Receive ARQ PDU is desirable.

It is also possible to implement reception determine procedures jointly. For example, RTD-OL and TXC can jointly operate on each Receive ARQ PDU. Discussion of joint reception determination implementations is beyond the scope of this paper.

Express Mailing Label No.: EJ923752498US

Bibliography

The following material, although not specifically referenced in the body of the present document (or not publicly available), gives supporting information.

- United States Patent 5664091: Method and system for avoiding unnecessary retransmissions using a selective rejection data link protocol

- United States Patent 5754754: Transmission order based selective repeat data transmission error recovery system and method Express Mailing Label No.: EJ923752498US Stephen Hershey      Page 13      04/07/00

History

| | Document history | |
|---|---|---|
| V1.1.1 | April 2000 | Initial publication |
| | | |

Express Mailing Label No.: EJ923752498US

What is claimed is:

1. A method of sending a plurality of blocks comprising data, the method comprising the steps of:
   generating a first message comprising at least one block of the plurality of blocks, an identification of the at least one block, and an identification of a first active send block of the plurality of blocks, wherein the at least one block appears in the plurality of blocks no earlier than the first active send block; and
   sending the first message from a sending device to a receiving device.

2. The method of claim 1, further comprising the step of inhibiting sending to the receiving device any block that appears in the plurality of blocks prior to the first active send block.

3. The method of claim 1, wherein the step of generating a first message comprises generating a message comprising a first block of the plurality of blocks, an identification of the first block, and an identification of a first active send block of the plurality of blocks.

4. The method of claim 3, wherein the first block is identified as the first active send block.

5. The method of claim 3, further comprising:
   receiving, from the receiving device, a status message indicating a reception status of the first message;
   when the status message indicates successful receipt of the first message, advancing the identification of the first active send block to a next block of the plurality of blocks; and
   when the status message indicates unsuccessful receipt of the first message, maintaining the identification of the first active send block consistent with the first message.

6. The method of claim 5, further comprising the step of resending the first message to the receiving device when the status message indicates unsuccessful receipt of the first message.

7. The method of claim 5, further comprising the step of sending, from the sending device to the receiving device, a second message comprising the next block of the plurality of blocks, an identification of the next block, and an identification of the next block as the first active send block, when the status message indicates successful receipt of the first message.

8. The method of claim 1, further comprising the step of the sending device advancing the identification of the first active send block to a second block.

9. The method of claim 8, wherein the step of advancing the identification of the first active send block to a second block is performed by the sending device in response to receiving, from the receiving device, a status message instructing the sending device to terminate sending of the first block.

10. The method of claim 8, wherein the step of advancing the identification of the first active send block to a second block is performed in response to a decision, by the sending device, to terminate sending of the first block.

11. The method of claim 1, wherein the first active send block comprises an anchor block identified by the sending device, defining an anchor send block.

12. The method of claim 11, wherein the anchor send block comprises a most delayed block identified by the sending device.

13. The method of claim 11, further comprising identifying, by the receiving device, a first anchor receive block based on the identification of the anchor send block.

14. The method of claim 13, further comprising the steps of:
   advancing, by the receiving device, the identification of the anchor receive block;
   sending, to the sending device, a status message including the identification of the advanced anchor receive block; and
   advancing, by the sending device, the identification of the anchor send block based on the identification of the advanced anchor receive block.

15. The method of claim 1, further comprising the steps of:
   generating, at the receiving device, a status message incident to receiving the first message from the sending device, the status message comprising an identification of a first active receive block of the plurality of blocks; and
   sending the status message from the receiving device to the sending device.

16. The method of claim 15, wherein the status message further comprises a count of how many blocks were received in error commencing with the first active receive block.

17. The method of claim 16, wherein the count of how many blocks were received in error includes at least one block that was received successfully.

18. The method of claim 16, wherein the status message comprises a count of 0, and the method further comprises the step of assuming any messages transmitted were not received successfully.

19. The method of claim 15, further comprising the steps of:
   comparing, by the sending device, a first time at which the first message was transmitted to a second time at which the status message was received;
   determining a time differential between the first time and the second time;
   when the time differential is greater than a predetermined threshold, deeming the information within the first status message as applicable to the first message;
   when the time differential is less than the predetermined threshold, deeming the information within the first status message as inapplicable to the first message.

20. The method of claim 19, further comprising the step of the receiving device including an indication of duplicate reception of a block.

21. The method of claim 15, wherein the status message comprises the last indication of transmission order successfully received by the receiver.

22. The method of claim 1, wherein the first message comprises an indication of transmission order of the first block relative to transmission order of other blocks of the plurality of blocks.

23. A method comprising the steps of:
   maintaining a send block transfer window associated with a sending device, the send block transfer window identifying a plurality of blocks adapted to be transferred from the sending device to a receiving device;
   maintaining a receive block transfer window associated with a receiving device, the receive block transfer window identifying a plurality of blocks adapted to be received by the receiving device;
   forming, by the sending device, a Send ARQ message field including,
   a send anchor field identifying a most delayed block of the plurality of blocks identified in the send block transfer window; and
   a send sequence number field identifying a current block of the plurality of blocks identified in the send block transfer window that is to be sent from the sending device to the receiving device;

forming, by the sending device, a data transfer request message including, in sequence, the send anchor field, the send sequence number field, and a block data field including data associated with the current block; and sending the data transfer message from the sending device to a receiving device.

24. The method of claim 23, further comprising:

forming, by the receiving device, a Receive ARQ message including, in sequence,
- a receive anchor field identifying a most delayed block of the plurality of blocks identified in the receive block transfer window; and
- a number corrupt field identifying a number of blocks of the plurality of blocks identified in the receive block transfer window that are reported as corrupt; and sending the Receive ARQ message from the receiving device to the sending device.

25. A method comprising:

attempting transfer, from a sending device to a receiving device, a plurality of blocks of data;

designating as corrupt, by the receiving device, at least a first block of the plurality of blocks;

reporting as corrupt, by the receiving device, a number of consecutive blocks of the plurality of blocks commencing with the first block, the number of consecutive blocks reported as corrupt including an allowable number of non-corrupt blocks based on a predefined parameter.

26. The method of claim 25, wherein the predefined parameter comprises a minimum corruption density defining a ratio of corrupt blocks to the number of blocks reported as corrupt.

27. The method of claim 25, further comprising re-transmitting, from the sending device to the receiving device, the number of consecutive blocks reported as corrupt.

28. The method of claim 25, wherein the step of reporting as corrupt, by the receiving device, a number of consecutive blocks is accomplished by the receiving device sending a status message to the sending device.

29. The method of claim 25, wherein the allowable number of non-corrupt blocks is based on available bandwidth for re-transmission of blocks.

* * * * *